Aug. 23, 1932.  P. E. COE  1,872,683
BATTERY TERMINAL CLAMP
Filed March 11, 1931
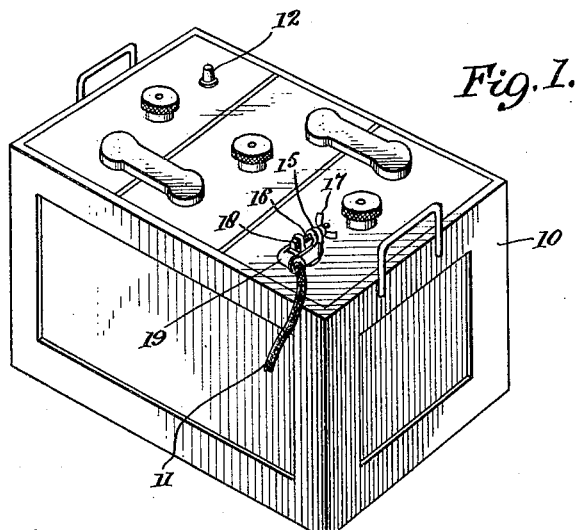
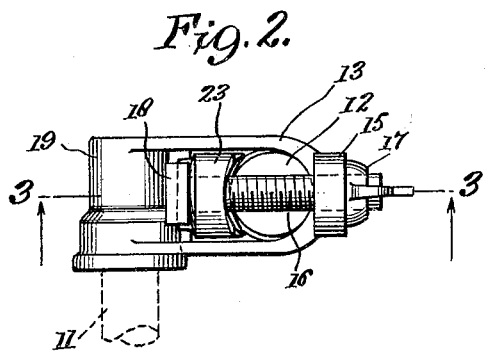
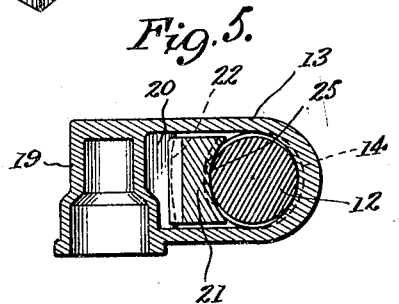
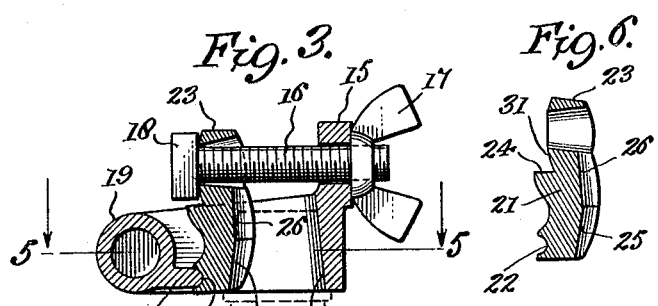
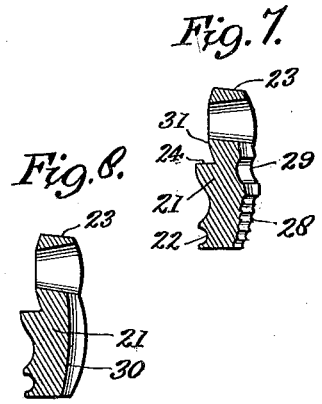
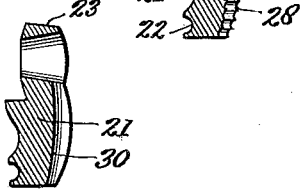
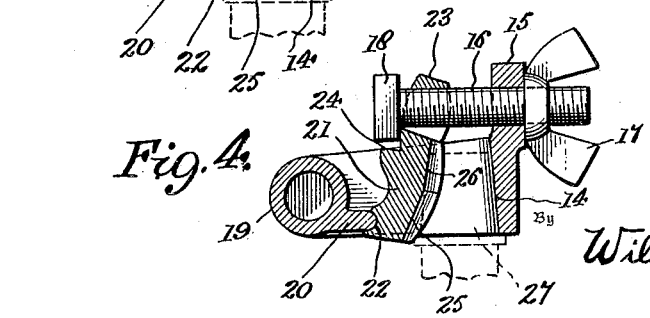
Inventor
Paul E. Coe
By Wilkinson & Mawhinney
Attorneys Patented Aug. 23, 1932

1,872,683

UNITED STATES PATENT OFFICE

PAUL E. COE, OF NEW ORLEANS, LOUISIANA

BATTERY TERMINAL CLAMP

Application filed March 11, 1931. Serial No. 521,767.

The present invention relates to clamps for detachably connecting in electrical contact the leads of storage batteries and the like to the terminal posts of the latter.

An object of the present invention is to provide a terminal clamp which is more efficient and substantial than those heretofore known and used, and which is particularly adapted for use with storage batteries used in motor vehicles, motor boats and other vehicles and installations, especially where the parts are subject to vibration and shock.

Another object of the invention is to provide a terminal clamp which may be quickly adjusted to battery posts of various sizes and types, and which may be quickly and easily applied to and removed from the posts, and a clamp which will not freeze tight to the terminal post, either through corrosion or otherwise, and which may be easily and readily removed without wrenching, straining or damaging the battery.

A further object of the present invention is to provide a terminal clamp of the type using a bolt and nut but which so peculiarly positions their parts as to locate them, when the clamp is applied, as to be as far away as possible from the source of corrosion, that is away from the face and filler caps of the battery, and at the same time in such position as to be easily accessible and to minimize the danger of damage to the filler caps and face of the battery from wrenches or other tools which may be used in operating on the bolt and nut to secure and remove the clamp.

Still further, the invention aims to provide a terminal clamp effecting a more efficient and substantial electrical connection or clamp for use wherever such clamp may be used to advantage; a clamp which will firmly and securely grip the post with a minimum pressure upon the tightening nut and continuously maintain a good electrical connection; a compact clamp composed of relatively few strong and durable parts so constructed and interfitting as to prevent separation during use, handling and shipping and which may be economically manufactured; and a clamp which when tightened will automatically adjust itself upon a battery post without necessitating the bending of metal or the insertion of shims or bushings.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a perspective view of a storage battery with a terminal post clamp in postion thereon connecting a lead to the battery.

Figure 2 is a top plan view of the clamp constructed according to the present invention and as applied to a battery post.

Figure 3 is a vertical section taken lengthwise through the same on the line 3—3 of Figure 2.

Figure 4 is a like view but with a relatively small battery post in the clamp.

Figure 5 is a horizontal section taken through the clamp as applied to a battery post, substantially on the line 5—5 of Figure 3.

Figure 6 is a detail longitudinal section taken through the rocking clamping member.

Figure 7 is a like view showing a slight modification in the clamping member wherein the same is provided with a gripping surface, and Figure 8 is a like view showing a further modification in the gripping surface.

Referring now to the drawing, Figure 1 shows at 10 a storage battery of the type such as is used in automobiles, motor boats and other vehicles for supplying current to ignition circuits and the like and wherein heavy leads 11 are used in carrying off the current. The battery 10 is provided with the usual terminal posts 12, and the improved clamp is adapted to be permanently attached to the end of the lead 11 and to be detachably engaged with the adjacent terminal post 12.

The clamp comprises a body portion 13 which is in the shape of a yoke, the closed end of which is rounded and adapted to bear against one side of the battery post 12, as clearly shown in Figures 2 and 5. The inner wall 14 at the closed end of the yoke 13 preferably tapers from the lower edge of the yoke inwardly and upwardly to the upper edge thereof, and the yoke is adapted to be seated over the upper extremity of the post 12 in a horizontal postion. The closed end of the yoke 13 is provided at its upper edge with an upwardly projecting eye 15 having a horizontal opening therethrough to serve as a support and bearing for the outer end of a clamping bolt 16 which is arranged horizontally above the yoke and which carries a winged nut, or other suitable clamping means, which bears against the outer face of the eye 15 for drawing the bolt 16 therethrough and effecting a clamping action. The bolt 16 is provided upon its inner end with a preferably rectangular head 18, or a head of any other suitable construction providing at least one flat lateral face.

The opposite sides or ends of the yoke 13 extend beyond the opposite side of the post 12 and are integrally formed with a lead socket 19 which opens laterally of the yoke 13, as shown in Figures 2 and 3, to receive therein the adjacent end of the lead 11, the latter being leaded or otherwise suitably secured in the socket 19.

The socket 19 has at its inner side and extending between the arms of the yoke 13 a fulcrum bead or lip 20 which lies substantially horizontally, as shown in Figure 3, and which, as shown in Figure 5, may have a slight transverse concavity at its outer edge to provide a seat and a pivotal support for a rocking clamping member 21. The rocking member 21 comprises a block which lies between the arms of the yoke 13 and is of slightly less width than the distance between the inner faces of the yoke arms so that the clamping member 21 may have a relatively free movement toward and from the adjacent side of the post 12 and also upon the bead or lip 20. The outer face of the clamping member 21, at its lower end, is provided with a transverse groove 22 the bottom of which may be slightly convex, as shown in Figure 5, to correspond substantially to the curvature of the bearing edge of the lip 20.

This groove 22 provides upper and lower ribs or abutments on the clamping member 21 adapted to seat against and about the free edge of the lip 20 to pivotally support the clamping member 21 and hold the same in alignment with the yoke 13. The upper end of the clamping member 21 is provided with an eye 23 which flares outwardly through the eye and is adapted to receive the outer end portion of the clamping bolt 16 with the head 18 of the bolt against the inner side of the eye 23. A shoulder 24 is formed upon the inner face of the clamping member 21 below the eye 23 and against which is adapted to engage the flat side of the head 18 of the bolt to hold the bolt from turning in the eye.

The opposite or engaging face of the clamping member 21 is stepped or provided with a lower post engaging face 25 and with an upper post engaging face 26. The relative locations of these post engaging faces are such as to first bring the lower face 25 into contact with a relatively large post 12 as shown in dotted lines in Figure 3, and, upon the further rocking of the clamping member 21 to bring the upper face 26 into engagement with a smaller post, such as shown in dotted lines at 27 in Figure 4. This arrangement of the upper and lower contact faces on the clamping member adapts the clamp to battery posts of different sizes, such as is usually found in the positive and negative posts of storage batteries.

As shown in Figure 7, the clamping member 21 may be provided with a modified form of lower post engaging surface 28 wherein the surface has a plurality of serrations or teeth across its face for binding engagement in the adjacent side of the relatively soft terminal post of the battery. In like manner, the upper engaging surface 29 may be provided with a transverse groove therein for engaging a smaller size post and to provide spaced gripping elements for binding engagement with the post, or the upper engaging surface 29 may be serrated and the lower engaging surface 28 may be grooved transversely, or both upper and lower engaging surfaces 28 and 29 may be either serrated or transversely grooved.

As another modified form of the engaging face of the clamping member 21, in Figure 8, the upper and lower clamping faces are shown as a continuous surface 30 which is curved vertically so as to advance the upper part of the shaft 30 into engagement with a smaller diameter post when the member 21 is rocked inwardly to a sufficient extent.

It is desirable however that in all structures of the engaging face of the clamping member such engaging face is transversely concave so as to conform to a large extent to the adjacent side of the battery post, as shown to advantage in Figure 5.

When the device is manufactured and assembled the clamping member 21 is held between the arms of the yoke 13 by the clamping bolt 16 and the latter is slackened sufficiently to admit of freedom of movement of the clamping member when the clamp is fitted over the upper end of a battery post 12. In positioning the clamp upon the post, it is only necessary to engage the groove 22 of the clamping member 21 upon the fulcrum bead or lip 20 and to then force the yoke 13 downwardly into horizontal position over the post 12 with the tapering end wall 14 of the yoke against one side of the post 12.

The clamping means, such as the winged nut 17, is now turned in a direction to draw the bolt 16 outwardly through the eye 15.

The head 18 of the clamping bolt is held from turning by the shoulder 24 on the clamping member 21 and the head 18 also bears against the adjacent side of the eye 23 so as to swing the clamping member 21 on its fulcrum 20 toward the closed end of the yoke. To admit of freedom of action of the clamping member 21, the eye 23 has at its outer side an inwardly beveled face 31 adapted to receive the lower portion of the head 18 when the clamping member is tilted to a relatively great extent, such as shown in Figure 4. It will also be noted that the opening through the eye 23 flares sufficiently to prevent the eye from binding on the bolt 16 when the clamping member 21 is tilted.

It will be apparent from Figures 3 and 4 that the pressure which is exerted against the post 12 is transmitted to the post through the clamping member 21 at a point which is slightly above the horizontal plane of the fulcrum lip or bead 20 so that when the clamping bolt 16 transmits pressure to the upper end of the clamping member 21 the leverage against the side of the post 12 is materially increased and consequently a relatively great pressure is exerted upon the clamping post as compared with the pressure required for turning up the nut 17. By means of this construction the nut 17 may be turned up with the fingers and the post 12 is gripped with practically the same force as is the case in such prior constructions where the clamping bolt acts directly upon the opposite sides of a split nut or sleeve which is deformed to engage the post.

It is apparent that as the clamping member 21 is tilted forwardly toward the closed end of the yoke the contacting surface of the clamping member is gradually advanced outwardly and upwardly with respect to the clamping surface 14 at the closed end of the yoke so that the upper and lower portions of the clamping surface admit of differences in construction or configuration to take care of large and small diameter posts which may be used in battery construction.

When it is desired to remove the clamp from a battery post, it is only necessary to turn the wing nut 17 in a reverse direction so as to release pressure upon the bolt 16. The clamping member 21 is thus released or freed and may be easily separated from the side of the post and the yoke may then be lifted free of the post without damage to the post or to the parts of the clamp.

The clamp is constructed of any suitable material, such as the lead coated brass which is commonly used in clamp construction and which is adapted to offset corrosion to a large extent. It will also be noted that the lead socket 19 is so located that it may be disposed remotely to the filler caps and other portions of the battery so that corrosion cannot readily take place at those portions of the clamp which are subject to manipulation.

It is obvious that various changes and modifications may be made in the details of construction and design of the above specifically described embodiment of this invention without departing from the spirit thereof, such changes and modifications being restricted only by the scope of the following claims.

What is claimed is:—

1. A battery terminal post clamp, comprising a yoke adapted to engage over a battery post with its closed end at one side of the post, a lead socket carried across the ends of the yoke and having a fulcrum bead across its inner side, a clamping member disposed within the yoke against said fulcrum bead for engagement against the opposite side of the post, and clamping means between the upper end of the clamping member and the yoke for swinging the member on the fulcrum bead into binding engagement with the post.

2. A battery terminal clamp comprising a yoke closed at one end and adapted to be fitted horizontally over a battery post with the closed end against one side of the post, a lead socket closing the opposite end of the yoke, a clamping member pivotally mounted at its lower end between the lower edge portions of the yoke, and clamping member engaging the upper ends of said member for swinging the same toward the closed end of the yoke to bind the clamping member against the opposite side of the post.

3. A battery terminal clamp comprising a yoke for engagement horizontally over a battery post, a clamping member hingedly mounted at its lower end between the arms of the yoke adjacent the lower edge portions thereof, and means between the upper end of the clamping member and the closed end of the yoke for swinging the clamping member toward the latter and binding a post between the closed end of the yoke and the clamping member.

4. A battery terminal clamp comprising a yoke closed at one end and adapted to engage over a terminal post with the closed end of the yoke at one side, a lead socket closing the opposite end of the yoke and provided at its inner side with an inwardly projecting fulcrum lip, a clamping member having a groove in its outer side and at its lower end for receiving said lip to hingedly connect the clamping member to the lip, said yoke and the upper end of said clamping member having upstanding eyes, and a clamping bolt engaging through said eyes adapted to be tightened for swinging the clamping member toward the closed end of the yoke and binding a post therebetween.

5. A battery terminal clamp comprising a yoke closed at one end for engagement over a battery post with the closed end against one side of the post, a clamping member arranged between the sides of the yoke, said yoke having a transverse fulcrum lip extending across its lower edge portion, said clamping member having a transversely disposed groove for receiving said lip therein to pivotally support the clamping member at its lower end, said lip and groove having complemental curved faces admitting of the lateral settling of the clamping member when subjected to pressure, said clamping member having a transversely concave gripping surface, and means between the yoke and the upper end of the clamping member for swinging the latter toward the free end of the yoke and binding a post therebetween.

6. A battery terminal clamp comprising a yoke closed at one end and adapted for engagement over a terminal post with the closed end at one side of the post, a clamping member pivotally mounted at its lower end between the arms of the yoke and extending upwardly therebetween, and clamping means between the yoke and the upper end of the clamping member for swinging the latter toward the closed end of the yoke to clamp a battery post therebetween, said clamping member having upper and lower transversely concave engaging faces relatively disposed for consecutive advancement during the tilting of the clamping member toward the closed end of the yoke to accommodate the terminal posts of different sizes.

PAUL E. COE.